United States Patent [19]

Li

[11] Patent Number: 5,310,856

[45] Date of Patent: May 10, 1994

[54] HIGH-TRANSPARENT AND HEAT-RESISTANT POLYESTERIMIDE

[75] Inventor: Chien-Hui Li, Hsinchu, Taiwan

[73] Assignee: Industrial Technology Research Institute, Hsinchu, Taiwan

[21] Appl. No.: 2,143

[22] Filed: Jan. 11, 1993

[51] Int. Cl.$^5$ .............................................. C08G 73/10
[52] U.S. Cl. ................................. 528/170; 528/171; 528/173; 528/174; 528/322
[58] Field of Search .............. 528/170, 171, 173, 174; 524/602

[56] References Cited

U.S. PATENT DOCUMENTS

| | | | |
|---|---|---|---|
| 3,426,098 | 2/1969 | Meyer | 260/841 |
| 3,697,471 | 10/1972 | Schmidt | 260/33.4 P |
| 4,855,390 | 8/1989 | Sasaki | 528/170 |
| 4,874,836 | 10/1989 | Wakabayashi et al. | 528/170 |

Primary Examiner—Harold D. Anderson
Attorney, Agent, or Firm—W. Wayne Liauh

[57] ABSTRACT

A heat-resistant and high-transparence polyesterimide composition is disclosed which is prepared from the reaction of: (a) an imidihydroxycarboxylic acid represented by the following formula:

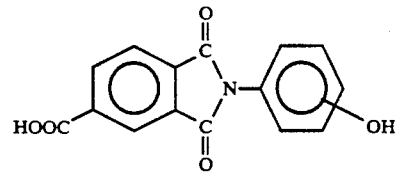

(b) at least one dicarboxylic, such as terephthalic acid or isophthalic acid, or mixture thereof, and (c) at least one dihydroxy compound represented by the following formula:

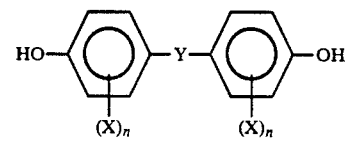

Wherein Y can be —C(CH$_3$)$_2$—, —SO$_2$—, —CH(CH$_3$)—, —(CH$_2$)$_m$—, where m in an integer of 1 to 10, —O—, or —S—; X can be H, Cl, or Br; and n is an integer of 0 to 4. The polyesterimide resins disclosed in this invention also exhibit improved fabricability due to their improved solubility in organic solvents, and improved mechanical strength.

13 Claims, 2 Drawing Sheets

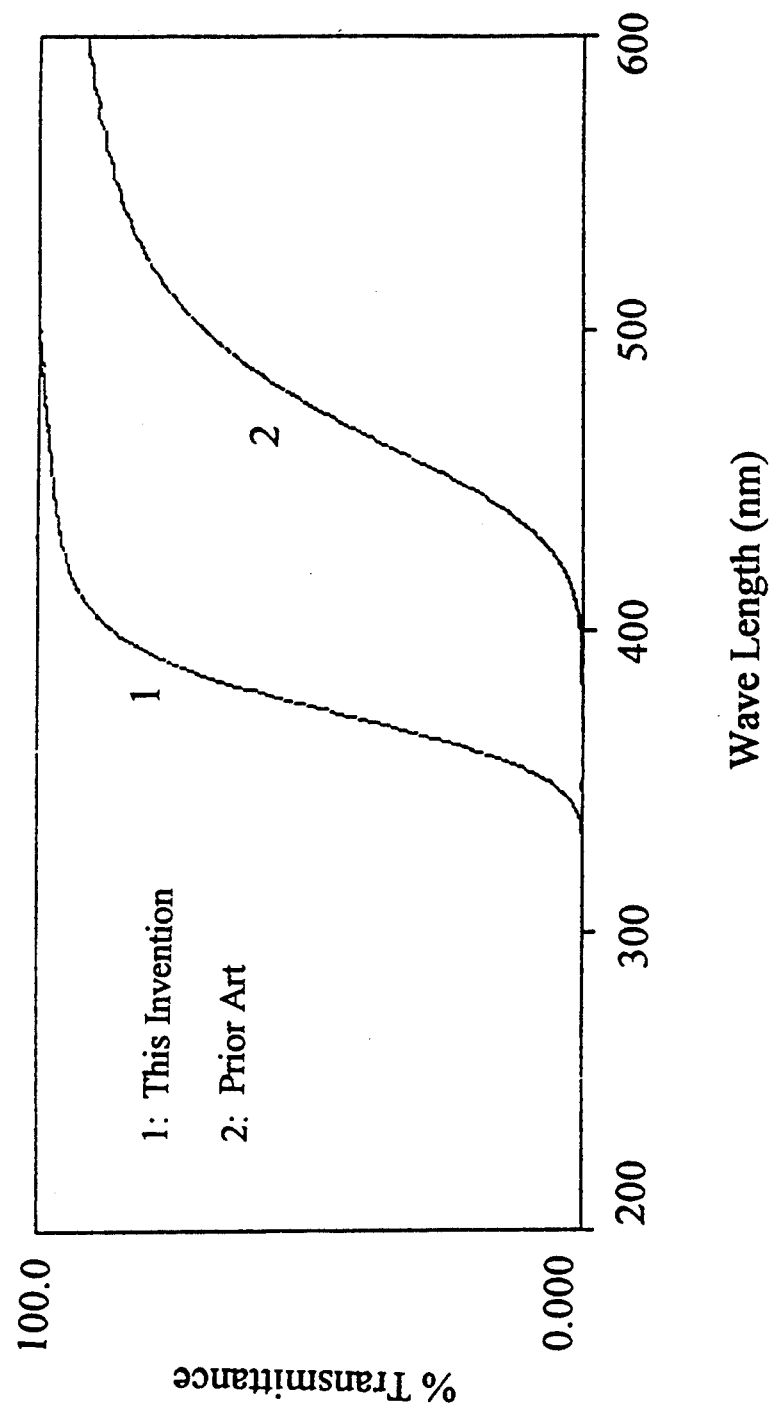

HIGH-TRANSPARENT AND HEAT-RESISTANT POLYESTERIMIDE

FIELD OF THE INVENTION

This invention relates to a method for the preparation of imide-containing polymeric resins. More particularly, this invention relates to a novel method for the preparation of polyesterimides which provide improved fabricability, excellent heat resistance and high transmittance to visible light rays.

BACKGROUND OF THE INVENTION

It has been known in the art that compounds containing imide group provide excellent heat resisting characteristics. It is also well-known in the art that polyimide resins exhibit superior heat resisting properties. Polyimide resins also provide excellent mechanical strength, in additional to their superior heat resisting properties. These advantageous properties thereof enable polyimides to be widely used in the industry. A typical example of the applications in which polyimides are extensively used is the production of printed circuit boards (PCBs), especially flexible PCBs. Polyimides are also widely used as varnishes for coating electric wires and in the making of packaging materials for the electronic/electrical industry.

One of the disadvantages of polyimides is their inferior solubility in most organic solvents. This solubility problem presents a barrier in attempting to directly applying the solution processing technology for fabricating polyimide products. In most applications where polyimides are utilized, a precursor polymer—most commonly a polyamic acid—is used instead of directly using the polyimide resin. After the fabricating steps, polyamic acid is then cyclized to become polyimide. The storage of polyamic acid prior to processing often causes a ponderous problem in the polyimide processing industry. This problem is aggravated by the strong corrosiveness of the polyamic acid. Furthermore, the need to dewater the final product after cyclization also adds difficulty to the polyamic-to-polyimide indirect solution processing approach. While this practice might have been acceptable in the past, it could raise serious problems as the need to mitigate environmental pollution is becoming a global concern.

In addition to poor solubility in organic solvents as described hereinabove, polyimides also exhibit relatively inferior transmissibility to visibly light rays. Such a poor transparence of polyimides is related to the frequency of molecular vibration of the polyimide molecules. In many industrial applications, it is desirable to provide a heat-resisting polyimide that is also highly transparent.

In U.S. Pat. No. 3,426,098 (the '098 patent), it is disclosed a polyester-polyimide prepared from the reactants of: (1) tris (2-hydroxyethyl) isocyanurate; (2) a polycarboxylic acid, such as terephthalic acid or isophthalic acid; (3) an aromatic diamine, such as oxydianiline or methylene dianiline; and (4) an aromatic carboxylic anhydride containing at least one additional carboxyl group, such as trimellitic anhydride or pyromellitic anhydride. Because of the existence of the fatty ester linkages, the polyester-polyimide resins prepared according to the '098 patent exhibit relatively inferior heat resisting property.

In U.S. Pat. No. 3,697,471 (the '471 patent), it is disclosed a polyesterimide resin produced from dimethyl terephthalate, ethylene glycol, glycerin, and a 5-membered imide ring compound. The 5-membered imide ring compound was produced from reactions of an aromatic carboxylic acid anhydride, which, besides the 5-membered cyclic carboxylic acid anhydride group, also contains at least one additional reactable group; and a primary amine, which, besides the primary amino group also contains at least one additional reactable group. Since the polyesterimides prepared according to the '471 patent also contain fatty ester linkages, they similarly exhibit relatively inferior heat resisting property.

The processes disclosed in both the '098 and the '471 patents require a phenolic solvent (cresol in the '098 patent and a mixture of p-chlorophenol, phenol and o-cresol in the '471 patent). The offensive odor of the phenolic solvents and their adverse effects on human skins could cause significant processing problems. The polyesterimide resins prepared according to either the '098 or the '471 patent show brownish color; they both exhibit inferior transmission to visible light rays. Furthermore, in order to achieve solubility in the solvents mentioned hereinabove, the polyesterimides disclosed in the '098 and the '471 have relatively low molecular weight. As a result, these resins have relatively poor filmability, poor mechanical strength, and are unsuitable for use as engineering plastics.

U.S. Pat. No. 4,855,390 discloses a polyesterimide resin obtained by the reaction between a bis-(hydroxyphthalimide) and a dicarboxylic acid dihalide. The bis-(hydroxyphthalimide) is prepared by reacting 4-hydroxyphthalic anhydride with an organic diamine such as m-phenylenediamine. The dicarboxylic acid dihalide is obtained by the halogenation of a dicarboxylic acid such as terephthalic acid. The polyesterimide resin prepared according to the '390 patent was reported to exhibit good heat resistance and light transmittance. However, the '390 patent did not address many of the important issues that have significant bearings on the commercial applicability of polyimide such as solubility, filmability, mechanical strength, and molecular weight thereof. Bis-(hydroxyphthalimide) is not a commercially available product and the polyesterimide of the '390 patent requires a two-step process.

SUMMARY OF THE PRESENT INVENTION

With the aforementioned disadvantages existing in the prior art polyesterimide resins, the primary object of the present invention is, therefore, to develop a method by which many of these disadvantages can be overcome. More particularly, the primary object of this invention is to develop a method for the polymerization of improved polyesterimides, which can be dissolved into a variety of organic solvents to facilitate ease of fabricability, while exhibiting desirable filmability and providing many excellent physical properties including heat resisting characteristics, mechanical strength, and light transmittance, The heat-resisting and high-transparence polyesterimide of this invention is prepared from the following three types of reactants:

(A) imidihydroxycarboxylic acid:

Specific examples of the imidihydrocarboxylic acid which may be used as a reactant in preparing the polyesterimide of this invention are represented by the following formula:

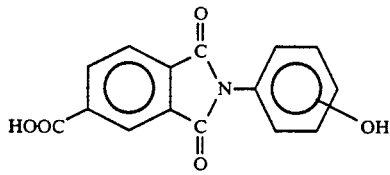

In the preferred embodiment, the hydroxy group can be in either the para-position, i.e., 4-carboxy-N-(p-hydroxy-phenyl) phthalimide, or the meta-position, i.e., 4-carboxy-N-(m-hydroxy-phenyl) phthalimide.

(B) Dicarboxylic Acid:

In the preferred embodiment, the dicarboxylic acid can be either terephthalic acid (TPA) or isophthalic acid (IPA), or mixture thereof.

Other dicarboxylic acids that may be used in practicing this invention include aliphatic dicarboxylic acids such as:

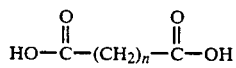

wherein n is an integer, and other aromatic dicarboxylic acids such as:

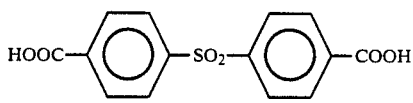

Specific example of other dicarboxylic acids include but are not limited to terephthalic acid, isophthalic acid, phthalic acid, phenylmalonic acid, phenylsuccinic acid, benzylsuccinic acid, oxalic acid, malonic acid, succinic acid, glutaric acid, methylsuccinic acid and adipic acid, ect.

(C) Dihydroxy Compound:

The dihydroxy compounds that can be used in practicing this invention are represented by the following formula:

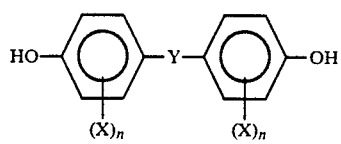

Wherein Y can be $-C(CH_2)_2-$, $-SO_2-$, $-(CH_3)-$, $-(CH_2)_m-$ where m in an integer of 1 to 10, $-O-$, or $-S-$; X can be H, Cl, or Br; and n is an integer of 0 to 4.

Examples of some of the dihydroxy compounds that may be conveniently used in the preparation of the polyesterimide resin of this invention include compounds represented by the following formulas:

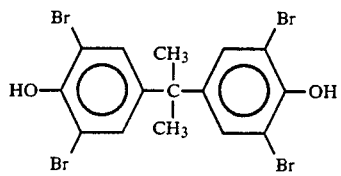

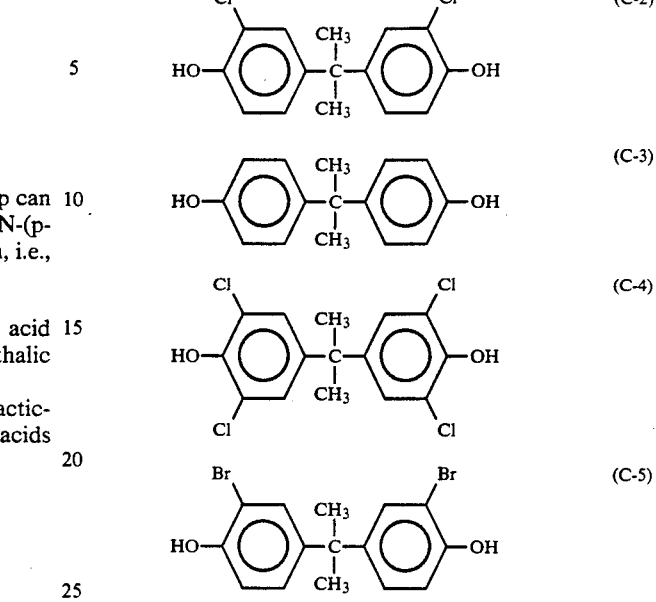

Specific examples of the dihydroxy compounds include but are not limited to: 2,2-bis-(4-hydroxyphenyl)-propane, 2,2-bis-(4-hydroxyphenyl)hexafluoropropane, bis-(2-hydroxypheyl)methane, bis-(4-hydroxyphenyl)methane, bis-(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)ethane, 1,3-bis-(3-methyl-4-hydroxyphenyl)propane, 2,2-bis-(3-phenyl-4-hydroxyphenyl)propane, 2,2-bis-(3-isopropyll-4-hydroxyphenyl)propane, 2,2-bis-(2-isopropyl-4-hydroxyphenyl)propane, 2,2-bis-(4-hydroxyphenyl)pentane, 3,3-bis-(4-hydroxyphenyl)pentane, 2,2-bis-(4-hydroxyphenyl)heptane, 1,2-bis-(4-hydroxyphenyl)-1,2-bis-(phenyl)-propane, 4,4'-(dihydroxyphenyl)ether, 4,4'-(dihydroxyphenyl)sulfide, 4,4'-(dihydroxyphenyl)sulfone, 4,4'-(dihydroxyphenyl)-sulfoxide, 4,4'-(dihydroxybenzophenone, hydroquinone, naphthalene diols, etc.

The mol ratio among imidihydroxycarboxylic acid: dicarboxylic acid: dihydroxy compound can be 1∼90 mol %: 5∼49.5 mol %: 5∼49.5 mol %. The number of mols of dicarboxylic acid should be approximately equal to the number of mols of dihydroxy compound, and the ratio between the number of mols of imidihydroxycarboxylic acid and the sum of the number of mols of dicarboxylic acid and dihydroxy compound should be between 90:10 to 1:99.

The polyesterimide of this invention can be produced with either a direct (i.e., solution) polycondensation process, or a melt polycondensation process. In the solution polycondensation process, the imidihydroxycarboxylic acid, dicarboxylic acid, and dihydroxy compound are added into an appropriate organic solvent to start the reaction. Appropriate organic solvents include: pyridine, or mixture of pyridine and N,N'-dimethyl acetamide (DMA). Diphenylchlorophosphate, $SOCl_2$, or Tosyl chloride ($CH_3C_6H_4SO_2Cl$) can be used as a polycondensation agent. Secondary polycondensation agents such as lithium chloride, calcium chloride, etc., can also be added to the reactant mixture.

In the melt polycondensation process, the dihydroxy compound and the imidihydroxycarboxylic acid are first esterized before mixing with the dicarboxylic acid. The polycondensation reaction takes place at elevated temperatures under a high vacuum environment. Alternatively, the melt polycondensation process can be achieved by using dicarboxylic acid, dihydroxy compound, imidihydroxycarboxylic acid, and acetic acid anhydride as reactants. Suitable catalysts for the melt polycondensation reaction include tetrabutyl citrate, isopropyl citrate, and zinc acetate, etc.

BRIEF DESCRIPTION OF THE DRAWINGS

The objects and advantages of this invention will become more apparent upon reading the following detailed description and upon reference to the drawings in which:

FIG. 2 is a graphic illustration comparing the light transmittance through a polyesterimide prepared according to a preferred embodiment of this invention and that of a commercially available polyimide.

DETAILED DESCRIPTION OF THE PREFERRED EMBODIMENT

Figure 1:
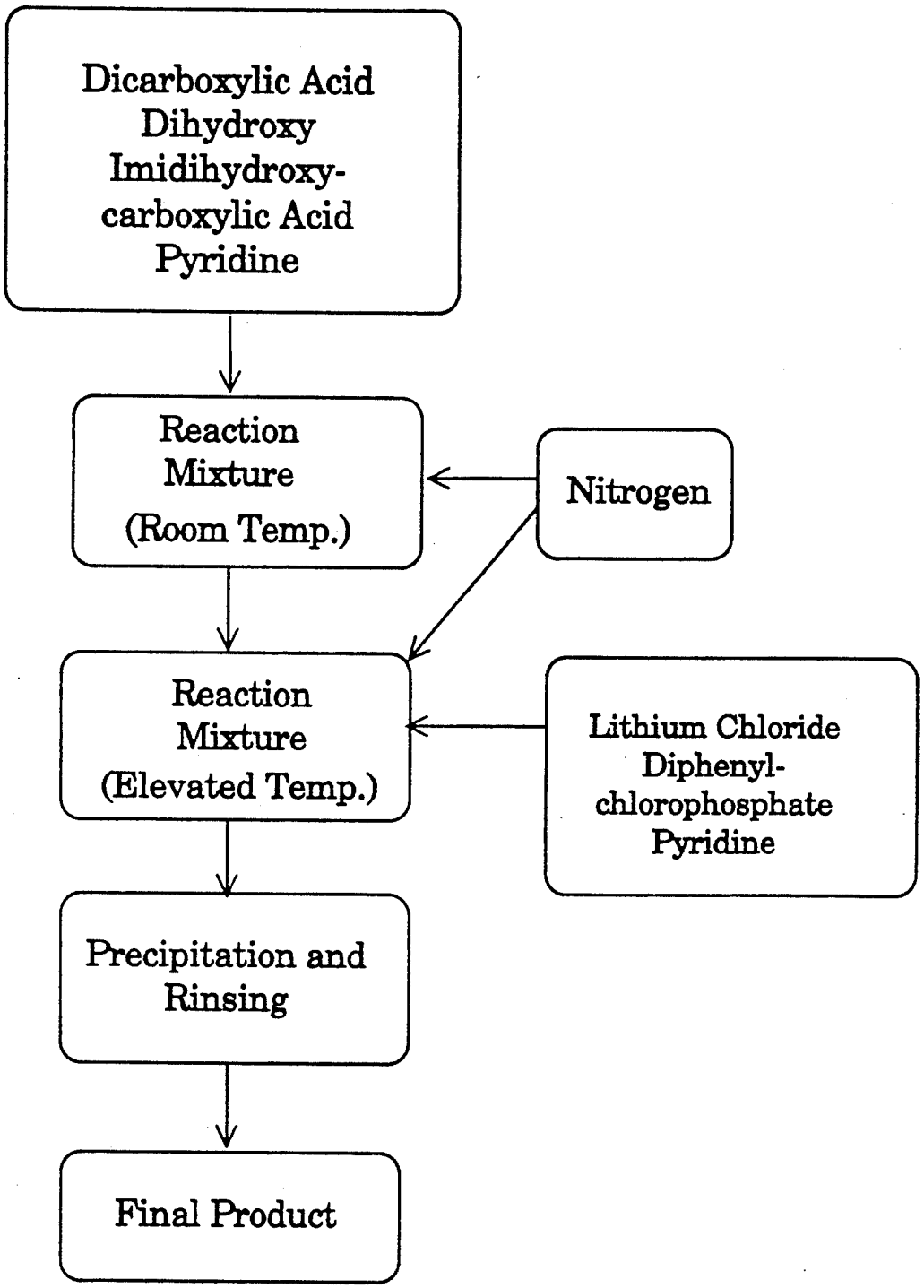
FIG. 1 is a schematic flow chart illustrating the steps of carrying out a preferred embodiment of this invention using a solution polycondensation process.

The present invention will now be described more specifically with reference to the following examples.

Example 1

Preparation of 4-carboxy-N-(m-hydroxy-phenyl) phthalimide

A mixture containing 0.21 mol of m-aminophenol, 0.21 mols of trimellitic anhydride, and 200 ml of acetic acid was placed under a nitrogen blanket and heated first at 60° C. for 4 hours then at 90° C. for 3 hours. Then, the reaction mixture was put under reflux for 4 hours. Thereafter, the mixture was allowed to cool down to room temperature and then 600 ml of glacial acetic acid were added to the mixture. The mixture was filtered through a filter and the filter cake was collected. The filter cake was then rinsed with hot water, re-filtered, rinsed with hot isopropane, and re-filtered again. The rinsed solid was dried at 80° C. under vacuum for 12 hours. The melting point of the final product was measured to be between 302° and 304° C. An elemental analysis was performed on the reaction product for the quantitative identification of the elements contained thereof. A comparison between the measured values and the calculated values, which are based on the molecular formula $C_{15}H_9NO_5$, is shown below:

|  | C | H | N |
| --- | --- | --- | --- |
| Measured Value | 63.34% | 3.33% | 4.87% |
| Calculated Value | 63.61% | 3.20% | 4.95% |

The product obtained from Example 1 is 4-carboxy-N-(m-hydroxy-phenyl) phthalimide, which is designated as M1 in subsequent discussions.

Example 2

Preparation of 4-carboxy-N-(p-hydroxy-phenyl) phthalimide

A mixture containing 0.42 mol of p-aminophenol, 0.42 mols of trimellitic anhydride, and 400 ml of N-methyl-2-pyrrolidone (NMP) was placed under a nitrogen blanket and heated first at 50° C. for 2.5 hours; then, the reaction mixture was put under reflux for 3 hours. Thereafter, the mixture was allowed to cool down to room temperature and 600 ml of glacial acetic acid were added to the mixture. The mixture was filtered through a filter and the filter cake was collected. The filter cake was rinsed with hot water, re-filtered, rinsed with hot isopropanol, and re-filtered again. The final rinsed solid was dried at 80° C. under vacuum for 12 hours.

The product obtained from Example 2 is 4-carboxy-N-(p-hydroxy-phenyl)·phthalimide, which is designated as M2 in subsequent discussions.

Example 3

Preparation of Polyesterimide

Example 3 provides detailed description of the steps for preparing a polyesterimide resin according to a preferred embodiment of this invention.

A polycondensation agent was first prepared by first dissolving 10 m-mol of lithium chloride into 20 ml of pyridine, then adding 13 m-mol of diphenyl chlorophosphate. The reaction was carried out at room temperature for 30 minutes. Another reaction mixture containing 4 m-mol of 4-carboxy-N-(m-hydroxy-phenyl) phthalimide (M1) prepared from Example 1, 1.5 m-mol of terephthalic acid (TPA), 1.5 mol of isophthalic acid (IPA), 3 m-mol of bisphenol A, and 10 ml of pyridine was prepared. The reaction mixture was stirred at room temperature under a nitrogen blanket for 10 minutes, then the reaction temperature was raised to 120° C. After the reaction mixture was stirred for 5 minutes at 120° C., the polycondensation agent prepared hereinabove was gradually added, drop by drop, into the reaction mixture; the entire feeding step took about 30 minutes. The entire reaction mixture was continuously stirred at 120° C. for another 3 hours. Thereafter, the reaction mixture was poured into water, while stirring, to precipitate the solid polymer product, which was then rinsed with boiling methanol for one hour and dried in an 80° C. vacuum.

A series of tests were then conducted on the polymer product to measure its several properties. These include: glass transition temperature ($T_g$, using Du Pont TMA 2940 under nitrogen blanket, rate of temperature increase was 20° C./min.), thermal decomposition temperature ($T_d$, using Du Pont TGA 951 under nitrogen blanket, rate of temperature increase was 10° C./min.), mechanical strength (according to ASTM D638 standard), and transparence (using a Hitachi H-2000 UV Spectrometer). In this and subsequent examples, the thermal decomposition temperature is defined as the temperature at which the polymer product shows a 5% weight loss, whereas transparence is reported at a wavelength of 400 nm.

The polymer product prepared from this specific example was tested to have a $T_g$ of 211° C., a $T_d$ of 481° C., a transparence of 90% (at a thickness of 23 μm). As to mechanical strength, the same polymer product has a tensile strength of 6.39 Kg/mm$^2$, and an elongation (at break) of 5.94%. FIG. 2 shows the transmittance through a polyimide (kapton) layer and a polyesterimide layer of this invention, at wavelengths from 200 to 600 nm. In FIG. 2, the polyimide layer tested has a thickness of 12 μm; whereas, the polyesterimide layer of this invention has a thickness of 23 μm.

Example 4 through 17

Preparation of Polyesterimides of varying monomer compositions

The procedures followed in Examples 4 through 17 were identical with those in Example 3, except that the monomer compositions used therein have been varied. Tables 1 through 4 summarize the monomer composition and the physical properties of the polymer product obtained therefrom, in Examples 3 through 17. Table 5 provides a comparison of various properties of the polyesterimide of this invention and ISOMID, a commercial polyiestermide.

It is evident from the above tests that the imide-containing polymer resins prepared according to the method disclosed in this invention provide many improved properties, including heat resisting characteristics, light transmittance, filmability, solubility, fabricability, etc., over the prior art products. Tables 1 through 4 show that many polyesterimides of this invention are readily soluable in many industrial solvents such as NMP, N,N'-dimethylformamide (DMF), N,N'-dimethylacetamide (DMA), and m-cresol.

The foregoing descriptions of examples including preferred embodiments of this invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of this invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

TABLE 1

| Example | $M_1$ | TPA/IPA | Bisphenol A | Reaction State | Property of Film | Inherent Viscosity (dl/g) | $T_g$ (°C.) | $T_d$ (°C.) | Solubility in NMP | DMA | DMF | m-cresol |
| --- | --- | --- | --- | --- | --- | --- | --- | --- | --- | --- | --- | --- |
| 3 | 4 | 1.5/1.5 | 3.0 | Clear | flexible | 0.52 | 211 | 481 | ++ | ++ | ++ | ++ |
| 4 | 5 | 1.25/1.25 | 2.5 | Clear | flexible | 0.47 | 214 | 471 | ++ | ++ | ++ | ++ |
| 5 | 6 | 1.0/1.0 | 2.0 | Clear | flexible | 0.38 | 213 | 461 | ++ | ++ | ++ | ++ |
| 6 | 2 | 2.0/2.0 | 4.0 | Clear | flexible | 0.47 | 219 | 459 | ++ | ++ | ++ | ++ |
| 7 | 1 | 2.25/2.25 | 4.5 | Clear | flexible | 0.41 | 195 | 445 | ++ | ++ | ++ | ++ |

TABLE 2

| Example | $M_2$ | TPA/IPA | Bisphenol A | Reaction State | Property of Film | Inherent Viscosity (dl/g) | $T_g$ (°C.) | $T_d$ (°C.) | Solubility in NMP | DMA | DMF | m-cresol |
| --- | --- | --- | --- | --- | --- | --- | --- | --- | --- | --- | --- | --- |
| 8 | 5 | 1.25/1.25 | 2.5 | ppt | — | — | — | — | ± | ± | ± | ± |

TABLE 3

| Example | $M_2$ | IPA | Bisphenol A | Reaction State | Property of Film | Inherent Viscosity (dl/g) | $T_g$ (°C.) | $T_d$ (°C.) | Solubility in NMP | DMA | DMF | m-cresol |
| --- | --- | --- | --- | --- | --- | --- | --- | --- | --- | --- | --- | --- |
| 9 | 5 | 2.5 | 2.5 | ppt | — | — | 211 | — | ± | ± | ± | ± |
| 10 | 2 | 3.0 | 3.0 | ppt | — | — | — | — | ± | ± | ± | ± |
| 11 | 3 | 3.5 | 3.5 | opaque | flexible | 0.42 | 197 | — | + | S | + | + |
| 12 | 2 | 4.0 | 4.0 | Clear | flexible | 0.39 | — | — | ++ | ++ | + | ++ |
| 13 | 1 | 4.5 | 4.5 | Clear | flexible | 0.33 | 224 | — | ++ | ++ | — | ++ |

TABLE 4

| Example | $M_2$ | TPA | Bisphenol A | Reaction State | Property of Film | Inherent Viscosity (dl/g) | $T_g$ (°C.) | $T_d$ (°C.) | Solubility in NMP | DMA | DMF | m-cresol |
| --- | --- | --- | --- | --- | --- | --- | --- | --- | --- | --- | --- | --- |
| 14 | 4 | 3.0 | 3.0 | ppt | — | — | — | — | ± | ± | ± | ± |
| 15 | 3 | 3.5 | 3.5 | opaque | — | — | — | — | ± | S | S | ++ |
| 16 | 2 | 4.0 | 4.0 | Clear | flexible | 0.56 | 195 | — | + | + | ± | ++ |
| 17 | 1 | 4.5 | 4.5 | Clear | — | — | — | — | ± | S | S | ++ |

TABLE 5

|  | ISOMID | Polyesterimide of this invention |
| --- | --- | --- |
| Transparence (@ 400 nm) | ~0% | 90% |
| $T_g$, °C. | 182 | 187~215 |
| $T_d$, °C. | 427 | 445~481 |
| Filmability | brittle | flexible |
| Mechanical Strength | — | tensile strength: 6.39 Kg/mm² elongation: 5.94% |

What is claimed is:

1. A heat-resistant and transparent polyesterimide prepared from a reaction mixture consisting essentially of:

(a) imidihydroxycarboxylic acid represented by the following formula:

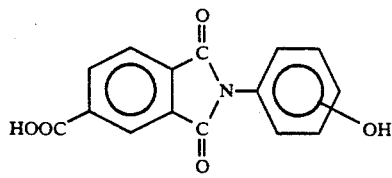

(b) at least one dicarboxylic acid; and (c) at least one dihydroxy compound represented by the following formula:

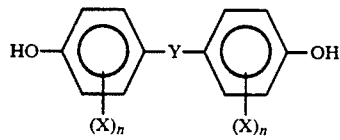

wherein Y is selected from the group consisting of —C(CH$_3$)$_2$—, —SO$_2$—, —CH(CH$_3$)—, —(CH$_2$)$_m$—, wherein m is an integer of 1 to 10, —O—, and —S—; X is selected from the group consisting of H, Cl, and Br; and n is an integer of 0 to 4.

2. The heat-resistant and transparent polyesterimide composition of claim 1 which is characterized by having a thermal decomposition temperature of at least 440° F., a light transparence of at least 50% when measured at a wavelength of 400 nm and a thickness of 23 μm, and being soluble in N-methyl-2-pyrrolidone, N,N'-dimethylformamide, N,N'-dimethylacetamide, and m-cresol.

3. The heat-resistant and transparent polyesterimide composition of claim 1 wherein said imidihydroxycarboxylic acid is selected from the group consisting of 4-carboxy-N-(p-hydroxy-phenyl) phthalimide and 4-carboxy-N-(m-hydroxy-phenyl) phthalimide.

4. The heat-resistant and transparent polyesterimide composition of claim 1 wherein said dicarboxylic acid is terephthalic acid, or isophthalic acid, or mixture thereof.

5. The heat-resistant and transparent polyesterimide composition of claim 1 wherein said imidihydroxycarboxylic acid is 1 to 90 mol percent of the total reactants, and each of said dicarboxylic acid is 5 to 49.5 mol percent of the total reactants.

6. A method for making a heat-resistant and transparent polyesterimide comprising the steps of:

(a) preparing a reaction mixture consisting essentially of the following three monomers:

(i) imidihydroxycarboxylic acid represented by the following formula:

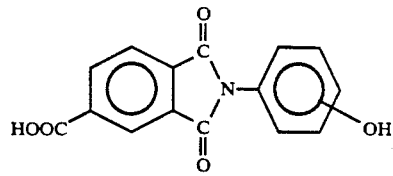

(ii) at least one dicarboxylic acid; and (iii) at least one dihydroxy compound represented by the following formula:

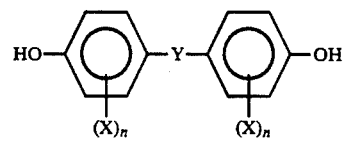

wherein Y is selected from the group consisting of —C(CH$_3$)$_2$—, —SO$_2$—, CH(CH$_3$)—, —(CH$_2$)$_m$— wherein m is an integer of 1 to 10, —O—, and —S—; X is selected from the group consisting of H, Cl, and Br; and n is an integer of 0 to 4;

(iv) an appropriate organic solvent;

(b) stirring the reaction mixture prepared from step (a) at a predetermined set of temperatures;

(c) pouring the reaction mixture from step (c) into water to cause precipitation of a solid product from the reaction mixture; and (d) filtering said solid product from said reaction mixture.

7. The method for making heat-resistant and transparent polyesterimide composition of claim 6 wherein said organic solvent is pyridine, or mixture of pyridine and N,N'-dimethyl acetamide.

8. The method for making heat-resistant and transparent polyesterimide composition of claim 6 wherein said imidihydroxycarboxylic acid is selected from the group consisting of 4-carboxy-N-(p-hydroxy-phenyl) phthalimide and 4-carboxy-N-(m-hydroxy-phenyl) phthalimide.

9. The method for making heat-resistant and transparent polyesterimide composition of claim 6 wherein said dicarboxylic acid is terephthalic acid, isophthalic acid, or mixture thereof.

10. The method for making heat-resistant and transparent polyesterimide composition of claim 6 wherein said imidihydroxycarboxylic acid is 1 to 90 mol percent of the total reactants, and each of said dicarboxylic acid is 5 to 49.5 mol percent of the total reactant.

11. The method for making heat-resistant and transparent polyesterimide composition of claim 6 which further comprises the step of adding a polycondensation agent into said reaction mixture, wherein said polycondensation being selected from the group consisting of diphenylchlorophosphate, SOCl$_2$, Tosyl chloride, lithium chloride, and calcium chloride.

12. A varnish composition comprising: (a) a polyesterimide resin described in claim 1; and (b) an organic solvent.

13. The varnish composition of claim 12 wherein said organic solvent is selected from the group consisting of N-methyl-2-pyrrolidone, N,N'-dimethylformamide, N,N'-dimethylacetamide, and m-cresol.

* * * * *